United States Patent
Zhao et al.

(10) Patent No.: US 9,891,767 B2
(45) Date of Patent: Feb. 13, 2018

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Shengji Yang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 196 days.

(21) Appl. No.: 14/648,059

(22) PCT Filed: Sep. 20, 2014

(86) PCT No.: PCT/CN2014/087002
§ 371 (c)(1),
(2) Date: May 28, 2015

(87) PCT Pub. No.: WO2015/180311
PCT Pub. Date: Dec. 3, 2015

(65) Prior Publication Data
US 2016/0048241 A1    Feb. 18, 2016

(30) Foreign Application Priority Data

May 30, 2014  (CN) .......................... 2014 1 0239921

(51) Int. Cl.
*G06F 3/044* (2006.01)
*G06F 3/041* (2006.01)
(Continued)

(52) U.S. Cl.
CPC ............ *G06F 3/044* (2013.01); *G02F 1/1368* (2013.01); *G02F 1/136286* (2013.01);
(Continued)

(58) Field of Classification Search
None
See application file for complete search history.

(56) References Cited

U.S. PATENT DOCUMENTS

2007/0058100 A1   3/2007 Ishii
2010/0194699 A1*  8/2010 Chang .................... G06F 3/044
                                                 345/173
(Continued)

FOREIGN PATENT DOCUMENTS

CN     102375258 A    3/2012
CN     102411237 A    4/2012
(Continued)

OTHER PUBLICATIONS

Second Chinese Office Action dated Nov. 30, 2016; Appln. No. 201410239921.3.
(Continued)

*Primary Examiner* — Christopher Kohlman
(74) *Attorney, Agent, or Firm* — Ladas & Parry LLP; Loren K. Thompson

(57) ABSTRACT

An in-cell touch panel and a display device are disclosed. The in-cell touch panel includes: an array substrate provided with top-gate thin-film transistors (TFTs); a plurality of mutually independent self-capacitance electrodes arranged in a same layer and disposed on a layer provided with the top-gate TFTs; a touch detection chip configured to determine a touch position in a touch period; and a plurality of wirings disposed beneath the layer provided with the top-gate TFTs and configured to connect the self-capacitance electrodes to the touch detection chip. Orthographic projections of patterns of the wirings on the array substrate shield patterns of active layers of the top-gate TFTs. The in-cell touch panel can reduce the manufacturing cost and improve the productivity.

20 Claims, 6 Drawing Sheets

(51) Int. Cl.
G09G 3/36 (2006.01)
G02F 1/1362 (2006.01)
G02F 1/1368 (2006.01)
G02F 1/1333 (2006.01)

(52) U.S. Cl.
CPC .......... *G06F 3/0412* (2013.01); *G06F 3/0416* (2013.01); *G09G 3/3659* (2013.01); *G02F 1/13338* (2013.01); *G02F 2001/13685* (2013.01); *G06F 2203/04103* (2013.01); *G06F 2203/04112* (2013.01); *G09G 3/3648* (2013.01); *G09G 2300/0809* (2013.01); *G09G 2320/0252* (2013.01)

(56) References Cited

U.S. PATENT DOCUMENTS

| | | | |
|---|---|---|---|
| 2012/0038585 | A1 | 2/2012 | Kim |
| 2014/0152613 | A1* | 6/2014 | Ishizaki ................ G06F 3/0412 345/174 |
| 2015/0049260 | A1* | 2/2015 | Yashiro .................. G06F 3/044 349/12 |
| 2016/0048241 | A1 | 2/2016 | Zhao et al. |

FOREIGN PATENT DOCUMENTS

| | | |
|---|---|---|
| CN | 101364018 A | 4/2013 |
| CN | 103226423 A | 7/2013 |
| CN | 103364983 A | 10/2013 |
| CN | 103455205 A | 12/2013 |
| CN | 103713792 A | 4/2014 |
| CN | 103793120 A | 5/2014 |
| CN | 104020892 A | 9/2014 |
| JP | 2013-015703 A | 1/2013 |
| KR | 20130020485 A | 2/2013 |

OTHER PUBLICATIONS

International Search Report and Written Opinion both dated Feb. 27, 2015; PCT/CN2014/087002.
First Chinese Office Action dated Jul. 5, 2016; Appln. No. 201410239921.3.
Chinese Office Action dated Feb. 28, 2017; Appln. No. 201410239921.3.
Extended European Search Report dated Dec. 13, 2017, Appln. No. 1483058.5.

* cited by examiner

IN-CELL TOUCH PANEL AND DISPLAY DEVICE

TECHNICAL FIELD

At least one embodiment of the present invention relates to an in-cell touch panel and a display device.

BACKGROUND

With the rapid development of display technology, touch screen panels have been gradually widespread in people's lives. Currently, in view of the structures, the touch screen panels can be divided into: add-on mode touch panels, on-cell touch panels and in-cell touch panels. An add-on mode touch panel needs to separately produce a touch screen and a liquid crystal display (LCD) which are hence bonded together to form an LCD with touch function. The add-on mode touch panels have the defects of high manufacturing cost, low light transmittance, thick modules, etc. An in-cell touch panel is to allow touch electrodes of a touch screen to be embedded into an LCD, not only can reduce the overall thickness of modules but also can greatly reduce the manufacturing cost of the touch panel, and is favored by the major panel manufacturers.

Currently, an in-cell touch panel detects the finger touch position in accordance with the mutual-capacitance or self-capacitance principle. A plurality of self-capacitance electrodes arranged in the same layer and insulated from each other are disposed in the touch panel in accordance with the self-capacitance principle. When a human body does not touch the screen, the capacitance of the self-capacitance electrode is at a fixed value. When the human body touches the screen, the capacitance of corresponding self-capacitance electrode is at the fixed value added to the body capacitance. A touch detection chip can determine the touch position by detection of capacitance variation of the self-capacitance electrodes in the touch period. As the body capacitance may act on the entire self-capacitance, compared with the case that the body capacitance can only act on the projected capacitance in mutual capacitance, the touch variation caused by the human body touch on the screen will be greater than that of a touch panel manufactured in accordance with the mutual-capacitance principle. Therefore, compared with the mutual-capacitance touch panel, the self-capacitance touch panel can effectively improve the signal-to-noise ratio of touch and hence improve the accuracy of touch sensing.

SUMMARY

At least one embodiment of the present invention provides an in-cell touch panel and a display device which are used for reducing the manufacturing cost of the in-cell touch panel and improving the productivity.

At least one embodiment of the present invention provides an in-cell touch panel, which comprises an array substrate provided with top-gate thin-film transistors (TFTs); a plurality of mutually independent self-capacitance electrodes arranged in the same layer and disposed on a layer provided with the top-gate TFTs of the array substrate; a touch detection chip configured to determine a touch position by detection of capacitance variation of the self-capacitance electrodes in a touch period; and a plurality of wirings disposed beneath the layer provided with the top-gate TFTs of the array substrate and configured to connect the self-capacitance electrodes to the touch detection chip. Orthographic projections of patterns of the wirings on the array substrate shield patterns of active layers of the top-gate TFTs.

At least one embodiment of the present invention provides a display device, which comprises the foregoing in-cell touch panel.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

Figure 1:
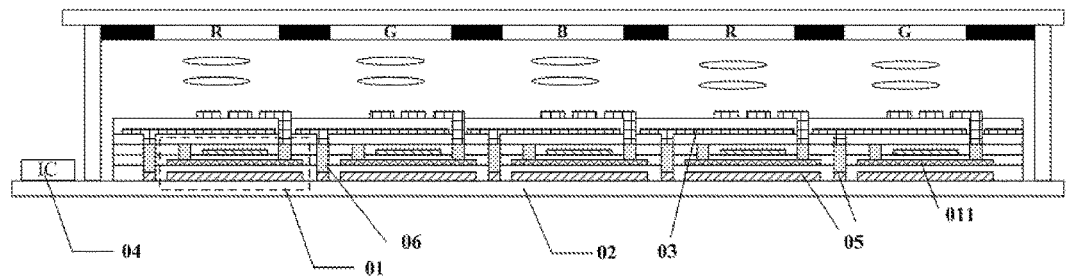
FIG. 1 is a schematic structural view of an in-cell touch panel provided by an embodiment of the present invention.

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

The inventors of the application has noted that: in the in-cell touch panel, in order to connect the self-capacitance electrodes to the touch detection chip, wirings connected with the self-capacitance electrodes correspondingly will be generally disposed. For instance, patterns of the wirings and the self-capacitance electrodes may be arranged in the same layer and may also be arranged in different layers. Although new patterning process is not required to be added if the wirings and the self-capacitance electrodes are arranged in the same layer, touch dead areas will be formed. All the wirings connected with a plurality of self-capacitance electrodes in the touch dead area run through the touch dead area. Thus, the signals in the touch dead area are relatively disordered, namely the touch performance in the area cannot be guaranteed. In view of this, in specific implementation, the wirings and the self-capacitance electrodes are usually arranged in different layers. In the in-cell touch panel, the wirings and the self-capacitance electrodes are arranged in different layers, so that two new layers must be added in the display panel, and hence new processes must be added in the process of manufacturing the panel. Therefore, the manufacturing costs can be increased and the productivity cannot be improved.

Currently, amorphous silicon (a-Si) is usually adopted to form active layers of TFTs of array substrates used in display panels. As the defects of the a-Si can result in the problems of low on-state current, low mobility, poor stability and the like of the TFTs, the application of the a-Si in many fields is limited. In order to overcome the defects of the a-Si, TFT array substrates adopting low-temperature poly-silicon (LTPS) as active layers are provided. Most current LTPS TFT array substrates are in top-gate TFT structures and mainly comprise: forming layers such as active layers, gate electrodes, source/drain electrodes and the like on a base substrate in sequence. In order to prevent the performances of the TFTs from being disadvantageously affected by photo-induced carriers produced upon active layers being irradiated by light from a backlight, a shield layer for preventing the active layers from being irradiated by the light is also disposed below the active layers in the array substrate, and a pattern of the shield layer is usually consistent with the pattern of the active layers.

Embodiments of the present invention provide a new capacitive in-cell touch panel structure on the basis of the LTPS TFT array substrate.

Detailed description will be given below to the preferred embodiments of the in-cell touch panel and the display device, provided by the embodiment of the present invention, with reference to the accompanying drawings.

The thickness and the shape of layers in the accompanying drawings do not reflect the true scale and are only intended to illustrate the content of the present invention.

At least one embodiment of the present invention provides an in-cell touch panel which, as illustrated in FIG. 1, comprises an array substrate 02 provided with top-gate TFTs 01, a plurality of mutually independent self-capacitance electrodes 03 arranged in the same layer and disposed on a layer provided with the top-gate TFTs 01 of the array substrate 02, a touch detection chip 04 configured to determine a touch position by detection of capacitance variation of the self-capacitance electrodes 03 in a touch period, and a plurality of wirings 05 disposed beneath the layer provided with the top-gate TFTs 01 of the array substrate 02 and configured to connect the self-capacitance electrodes 03 to the touch detection chip 04. Orthographic projections of patterns of the wirings 05 on the array substrate 02 shield/cover the patterns of active layers 011 of the top-gate TFTs.

In the in-cell touch panel provided by an embodiment of the present invention, the plurality of mutually independent self-capacitance electrodes 03 arranged in the same layer are disposed on the array substrate 02 in accordance with the self-capacitance principle; and the touch detection chip 04 can determine the touch position by detection of capacitance variation of the self-capacitance electrodes 03 in a touch period. Moreover, a pattern of the shield layer disposed beneath the top-gate TFTs 01 is modified to form the plurality of wirings 05. On one hand, the formed wirings 05 can connect the self-capacitance electrodes 03 to the touch detection chip 04 to realize the touch function. On the other hand, patterns of the formed wirings 05 shield patterns of the active layers 011 of the top-gate TFT 01, so that the phenomenon that normal display is affected by photo-induced carriers produced due to backlight irradiation can be avoided. In the touch panel provided by an embodiment of the present invention, the original pattern of the shield layer disposed beneath the top-gate TFTs 01 is modified to form the wirings 05 corresponding to the self-capacitance electrodes 03. Therefore, compared with the case that manufacturing processes of two layers must be added on the array substrate, in the embodiment of the present invention, the touch function can be achieved by adding only one process for forming the self-capacitance electrodes 03, and hence the manufacturing costs can be reduced and the productivity can be improved.

Figure 2:
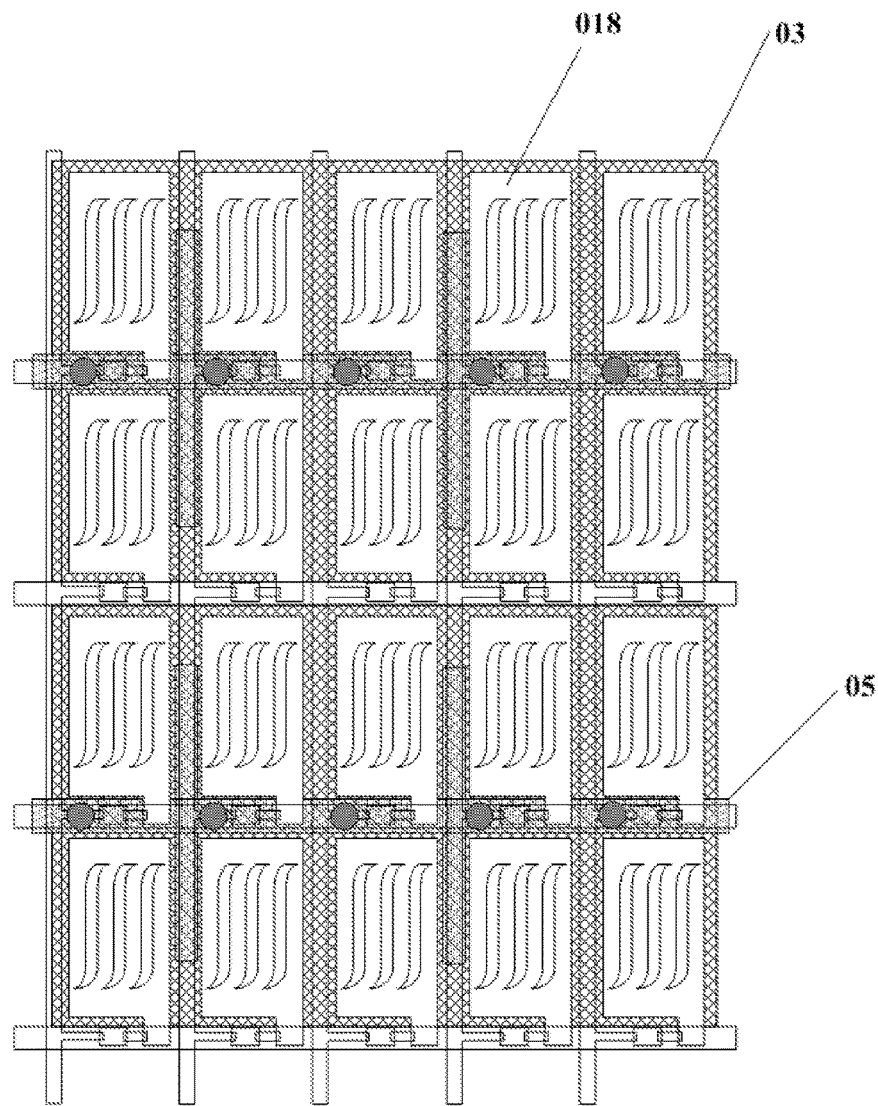
FIG. 2 is a schematic top view of the in-cell touch panel provided by an embodiment of the present invention in which self-capacitance electrodes and pixel electrodes are arranged in the same layer.

In the touch panel provided by one embodiment of the present invention, in order to not affect the aperture ratio of a display area, the patterns of the wirings 05 having the function of shielding the active layers 011 may be shielded by patterns of black matrixes (BMs), namely orthographic projections of the wirings 05 on the array substrate 02 are disposed at gaps between pixel units of the array substrate 02. In different embodiments, the pattern of the wiring 05 may be set to be in a horizontal strip structure, a vertical strip structure or a crisscrossed latticed structure as shown in FIG. 2, and may be designed according to actual performances. No limitation will be given here.

Figure 3:
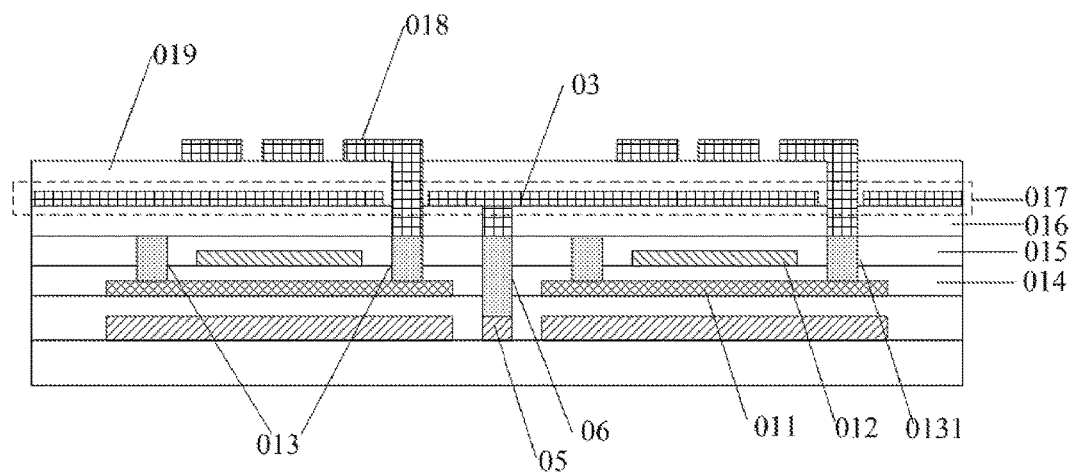
FIG. 3 is a schematic structural view of the in-cell touch panel provided by an embodiment of the present invention in which a common electrode layer is multiplexed as the self-capacitance electrodes.

For instance, in the touch panel provided by an embodiment of the present invention, the structure of the top-gate TFT adopted in the array substrate, as illustrated in FIG. 3, mainly include layers, e.g., an active layer 011, a gate electrode 012 and source/drain electrodes 013, that are disposed on a base substrate in sequence. A gate insulating layer 014 is disposed between the active layer 011 and the gate electrode 012, and an interlayer insulating layer 015 is disposed between the gate electrode 012 and the source/drain electrodes 013. Moreover, positions of the source/drain electrodes 013 and the gate electrode 012 are interchangeable, namely the gate electrode 012 is formed and next the source/drain electrodes 013 are formed, or the source/drain electrodes 013 are formed and then the gate electrode 012 is formed. No limitation will be given here. Description will be given below by taking the case that the gate electrode 012 is formed and then the source/drain electrodes 013 are formed as shown in FIG. 2 as an example.

For instance, as illustrated in FIG. 3, generally a passivation layer 016, a common electrode layer 017 and pixel electrodes 018 may also be included on the top-gate TFTs of the array substrate. Positions of the common electrode layer 017 and the pixel electrodes 018 are interchangeable. For instance, the common electrode layer 017 may be of a plate electrode and disposed on the lower layer (closer to a base substrate), and the pixel electrodes 018 are as slit electrodes and disposed on the upper layer (closer to a liquid crystal layer). Moreover, an insulating layer 019 is disposed between the pixel electrodes 018 and the common electrode layer 017. At this point, the pixel electrodes 018 are electrically connected with drain electrodes 0131 in the source/drain electrodes 013 via through holes running through the insulating layer 019 and the passivation layer 016. For instance, alternatively the pixel electrodes 018 may be of plate electrodes and disposed on the lower layer (closer to the base substrate), and the common electrode layer 017 is as a slit electrode and disposed on the upper layer (closer to the liquid crystal layer). An insulating layer 019 is also disposed between the pixel electrodes 018 and the common electrode layer 017. At this point, the pixel electrodes 018 are electrically connected with the drain electrodes 0131 in the source/drain electrodes 013 via through holes running through the passivation layer 016. Of course, the common electrode layer 017 may also be disposed on an opposing substrate (a color filter (CF) substrate) arranged opposite to the array substrate 02, namely the common electrode layer 017 is not disposed on the array substrate 02. Description will be given below by taking the case that the common electrode layer 017 is disposed below the pixel electrodes 018 as shown in FIG. 3 as an example.

In one embodiment, the common electrode layer 017 in the array substrate 02 is multiplexed/reused as the self-capacitance electrodes 03, namely the self-capacitance electrodes 02 are combined into the common electrode layer 017 on the array substrate 02. As illustrated in FIG. 3, when the structure of the common electrode layer 017 is modified and divided into the self-capacitance electrodes 03, no additional process is required. Therefore, the manufacturing costs can be reduced and the productivity can be improved.

Or in one embodiment, the self-capacitance electrodes 03 arranged in the same layer as the pixel electrodes 018 may be disposed at gaps between the pixel electrodes 018, namely the self-capacitance electrodes 03 and the pixel electrodes 018 on the array substrate 02 are arranged in the same layer, and a pattern of the self-capacitance electrode 03 is disposed at a gap between two adjacent pixel electrodes 018, as shown in FIG. 2. The structure of a pixel electrode layer is modified to form the self-capacitance electrodes 03 at the original gaps of the pixel electrodes 018, so that no additional process is required. Therefore, the manufacturing costs can be reduced and the productivity can be improved.

The resolution of the touch panel is generally in millimeter level. Therefore, in specific implementation, the density and the occupied area of the self-capacitance electrode 03 may be selected according to the required touch density so as to ensure the required touch resolution. Generally, the self-capacitance electrode 03 is designed to be a square electrode with the size of about 5 mm*5 mm. The resolution of a display is usually in micron level. Therefore, generally, one self-capacitance electrode 03 will correspond to a plurality of pixel units in the display.

In the in-cell touch panel provided by one embodiment of the present invention, when the common electrode layer 017 in an entire layer on the array substrate 02 is divided into the plurality of self-capacitance electrodes 03, in order to not affect the normal display function, in the process of dividing the common electrode layer 017, dividing lines may be kept away from opening areas for display and are disposed in an area provided with a pattern of a black matrix (BM) layer, namely orthographic projections of gaps between the self-capacitance electrodes 03 on the array substrate 02 may be disposed at gaps between pixel units of the array substrate 02.

Or in the in-cell touch panel provided by one embodiment of the present invention, when the patterns of the self-capacitance electrodes 03 are disposed at the gaps between the pixel electrodes 018, the pattern of the self-capacitance electrode 03 may be set to be of a latticed structure by taking the pixel electrodes 018 as meshes. FIG. 2 illustrates the pattern of two self-capacitance electrodes 03.

In the touch panel provided by the embodiment of the present invention, no matter whether the common electrode layer 017 is multiplexed as the self-capacitance electrodes 03 or the self-capacitance electrodes 03 are disposed at the gaps between the pixel electrodes 018, in order to reduce the mutual interference between display signals and touch signals, in specific implementation, the time-sharing drive mode in the touch period and the display period is adopted. Moreover, in one embodiment, a display drive chip and a touch detection chip may also be integrated into one chip, so that the manufacturing costs can be further reduced.

Figure 4A:
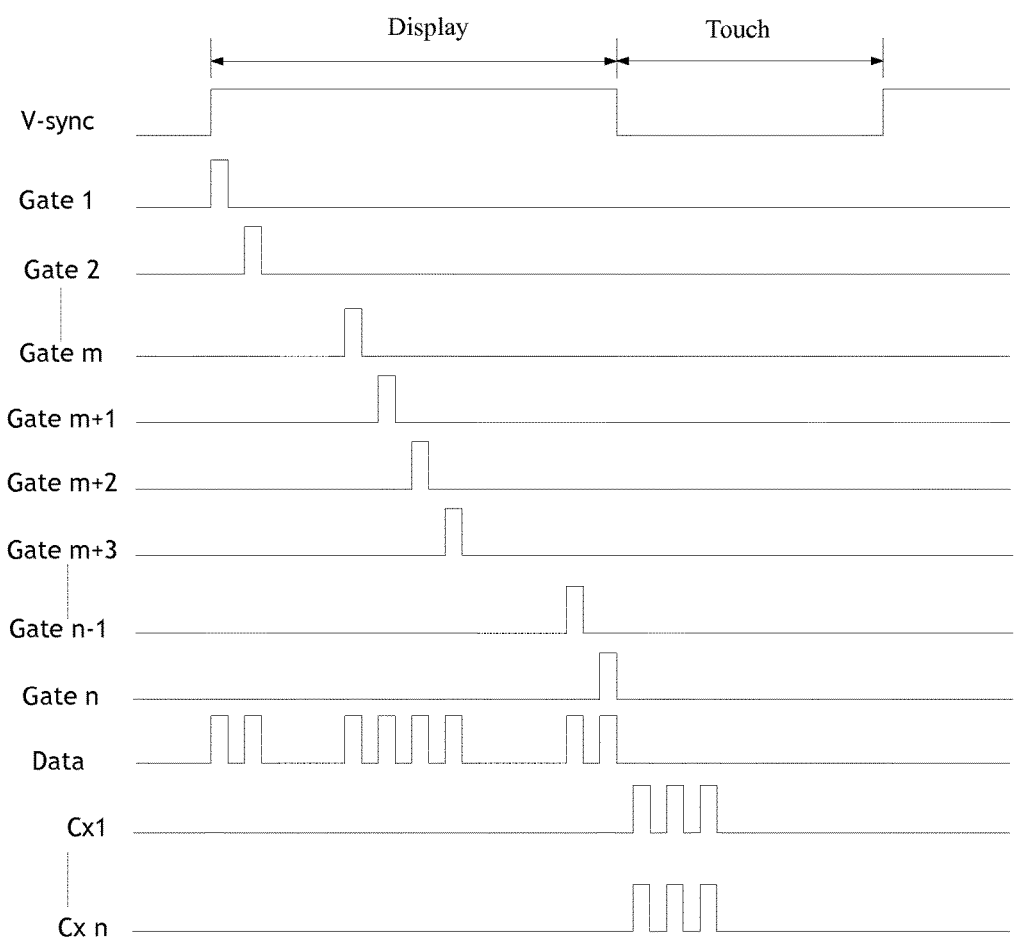
FIGS. 4a and 4b are respectively a drive timing sequence diagram of the in-cell touch panel provided by an embodiment of the present invention.
Figure 4B:
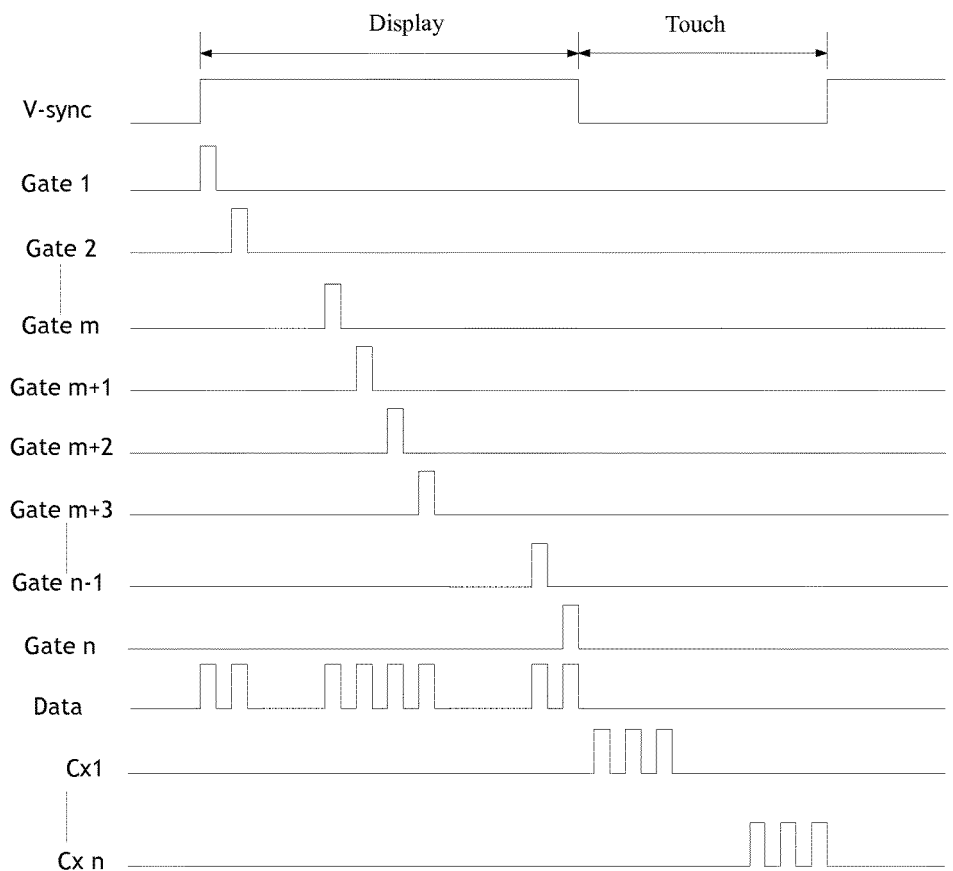

For instance, in the drive timing sequence diagram as shown in FIGS. 4a and 4b, the time of the touch panel for displaying each frame (V-sync) is divided into a display period (Display) and a touch period (Touch). For instance, in the drive timing sequence diagram as shown in FIGS. 4a and 4b, the time of the touch panel for displaying one frame is 16.7 ms, in which 5 ms is selected as the touch period and the remaining 11.7 ms is taken as the display period. Of course, the duration of the touch period and the display period may also be appropriately adjusted according to the processing capability of an IC. No specific limitation will be given here. In the display period, a gate scanning signal is applied to each gate signal line Gate 1, Gate 2 . . . Gate n in the touch panel in sequence, and gray-scale signals are applied to data signal lines Data; and when the common electrode layer is multiplexed as the self-capacitance electrodes, the touch detection chip connected with the self-capacitance electrodes Cx 1 . . . Cx n is configured to apply common electrode signals to the self-capacitance electrodes Cx 1 . . . Cx n respectively to achieve the function of liquid crystal display. In the touch period, as illustrated in FIG. 4a, the touch detection chip connected with the self-capacitance electrodes Cx 1 . . . Cx n may apply drive signals to the self-capacitance electrodes Cx 1 . . . Cx n simultaneously and receive feedback signals of the self-capacitance electrodes Cx 1 . . . Cx n simultaneously; or as illustrated in FIG. 4b, the touch detection chip connected with the self-capacitance electrodes Cx 1 . . . Cx n may apply drive signals to the self-capacitance electrodes Cx 1 . . . Cx n sequentially and receive feedback signals of the self-capacitance electrodes Cx 1 . . . Cx n respectively. No limitation will be given here. Whether touch occurs is determined by the analysis of the feedback signals, so that the touch function can be achieved.

In the touch panel provided by the embodiment of the present invention, a plurality of layers are disposed between the self-capacitance electrodes 03 arranged on the array substrate 02 and the wirings 05 connected with the self-capacitance electrodes 03, and the self-capacitance electrodes 03 must be connected with the wirings 05 disposed at the bottom via through holes running through the layers. Therefore, in different embodiments, in order to ensure better up-and-down connection between the self-capacitance electrodes 03 and the wirings 05, conducting portions may be made from the metal material for the source/drain electrodes 013 and/or the gate electrodes 012 in the TFTs 01 between the self-capacitance electrodes 03 and the wirings 05. In the manufacturing process, the conducting portions are connected with the wirings 05 and next connected with the self-capacitance electrodes 03. The specific implementations may be as follows.

First possible implementation is as follows: as illustrated in FIG. 3, first conducting portions 06 are arranged in the same layer as the source/drain electrodes 013 in the top-gate TFTs 01, and the self-capacitance electrodes 03 are electrically connected with the wirings 05 through the first conducting portions 06.

Second possible implementation is as follows: second conducting portions are arranged in the same layer as the gate electrodes 012 in the top-gate TFTs 01, and the self-capacitance electrodes 03 are electrically connected with the wirings 05 through the second conducting portions.

Third possible implementation is as follows: first conducting portions are arranged in the same layer as the source/drain electrodes 013 in the top-gate TFTs 01, and second conducting portions are arranged in the same layer as the gate electrodes 012 in the top-gate TFTs 01. The first conducting portions are electrically connected with the second conducting portions first, and then the self-capacitance electrodes 03 are electrically connected with the wirings 05 through the first conducting portions and the second conducting portions.

Figure 5A:
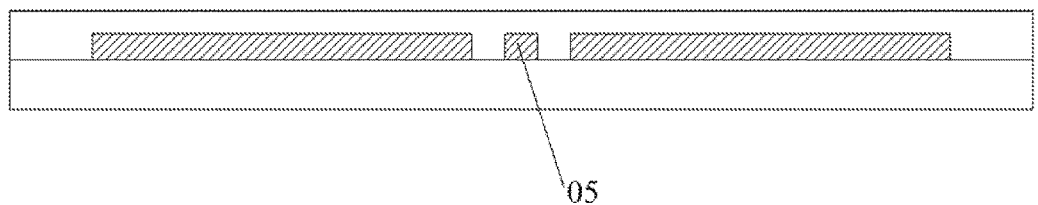
FIGS. 5a to 5h are respectively a schematic structural view of the product obtained after the execution of a step of the method for manufacturing the structure as shown in FIG. 3.

Detailed description will be given below to the process for manufacturing the array substrate of the touch panel provided by the embodiment of the present invention by taking the case that the common electrode layer 017 is multiplexed/reused as the self-capacitance electrodes 03 as an example and taking the first possible implementation as an example. For instance, the process for manufacturing the array substrate may comprise the following steps:

1. Forming patterns of wirings 05 on a base substrate, and depositing $SiO_2$ and SiNx materials on the patterns of the wirings 05 to form an insulating layer, as shown in FIG. 5a.

Figure 5B:
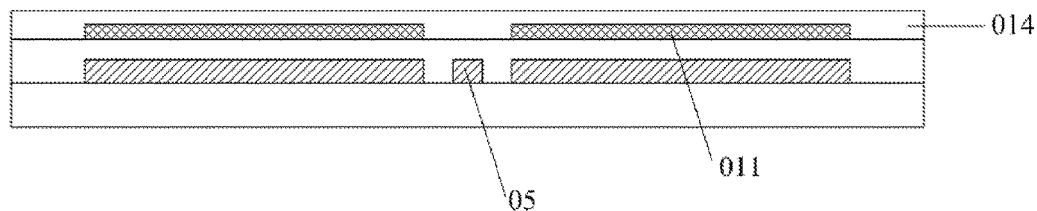

2. Depositing polysilicon (poly-Si) on the insulating layer to form patterns of active layers 011, and depositing $SiO_2$ and SiNx materials on the patterns of the active layers 011 to form a gate insulating layer 014, as shown in FIG. 5b.

Figure 5C:
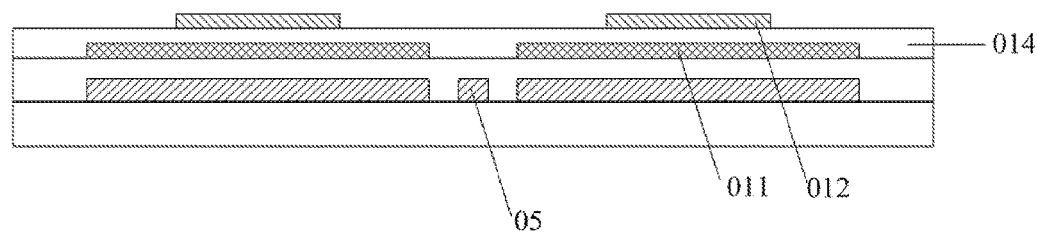

3. Forming patterns of gate electrodes 012 on the gate insulating layer 014, as shown in FIG. 5c.

Figure 5D:
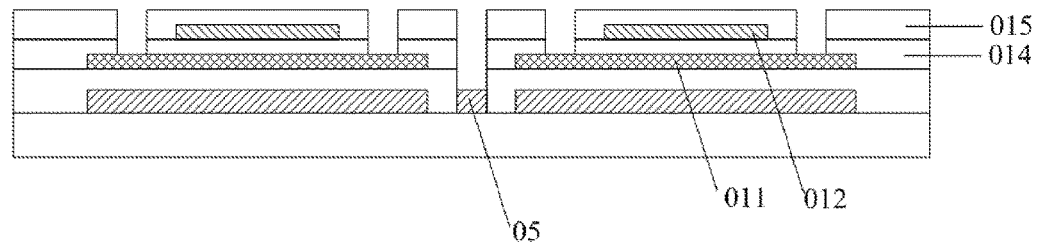

4. Forming a pattern of an interlayer insulating layer 015 on the patterns of the gate electrodes 012, as shown in FIG. 5d; and forming first through holes at connections between the wirings 05 and first conducting portions 06 and second through holes at connections between source/drain electrodes 013 and the active layers 011, in the interlayer insulating layer 015 and the gate insulating layer 014.

Figure 5E:
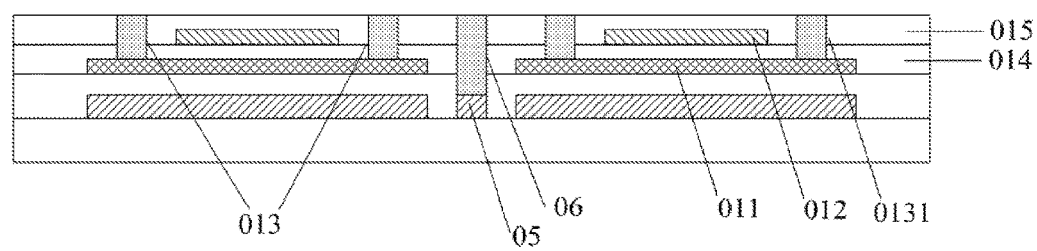

5. Forming patterns of the source/drain electrodes 013 and the first conducting portions 06 on the pattern of the interlayer insulating layer 015, as shown in FIG. 5e, in which the source/drain electrodes 013 are electrically connected with the active layers 011 via the second through holes, and the first conducting portions 06 are electrically connected with the wirings 05 via the second through holes.

Figure 5F:
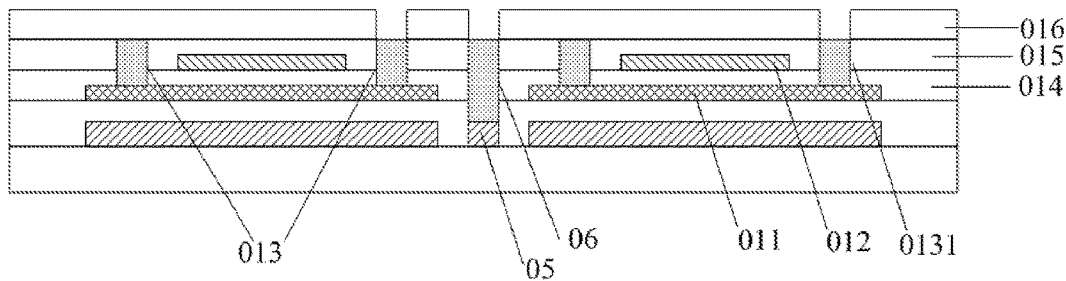

6. Forming a pattern of a passivation layer 016 on the patterns of the source/drain electrodes 013 and the first conducting portions 06, as shown in FIG. 5f; and forming through holes at positions corresponding to drain electrodes 0131 of the source/drain electrodes 013 and through holes at positions corresponding to the first conducting portions 06, in the passivation layer 016.

Figure 5G:
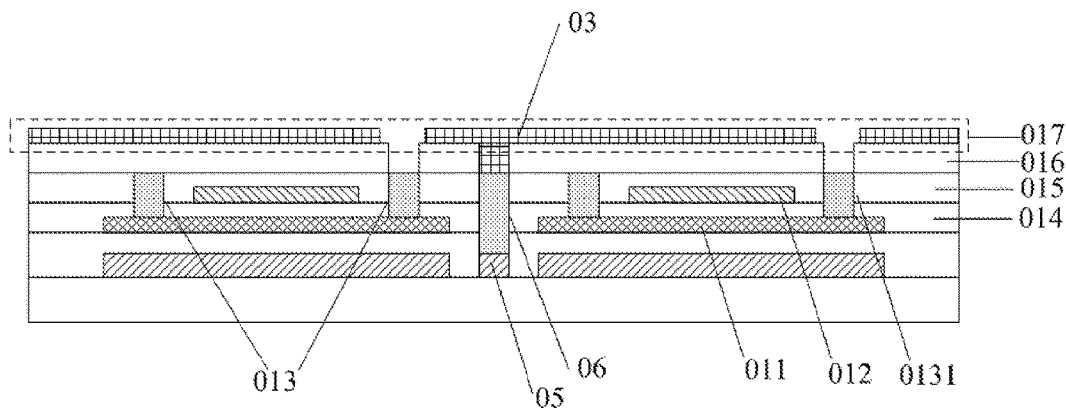

7. Forming a pattern of a common electrode layer 017 on the pattern of the passivation layer 016, as shown in FIG. 5g; and dividing the common electrode layer 017 into patterns of the plurality of self-capacitance electrodes 03 insulated from each other, in which the self-capacitance electrodes 03 are electrically connected with the first conducting portions 06 via the through holes, formed at the positions corresponding to the first conducting portions 06, in the passivation layer 016.

Figure 5H:
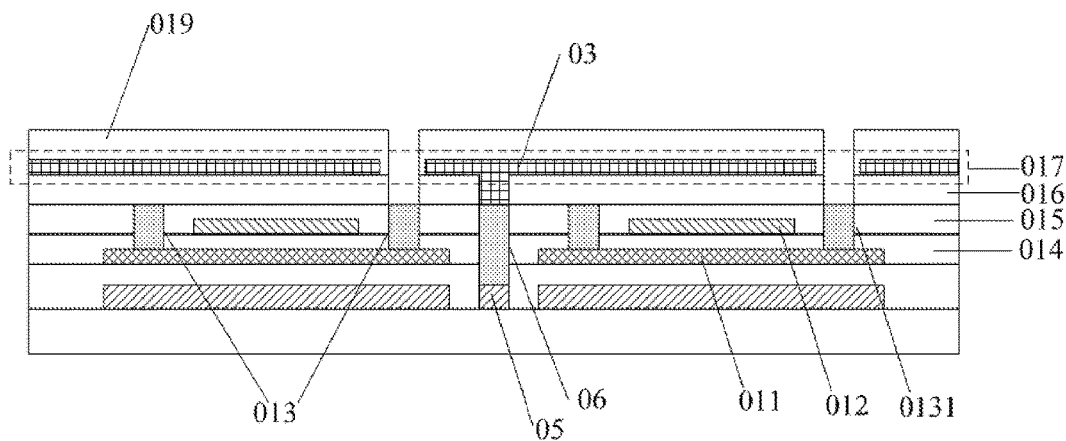

8. Forming a pattern of an insulating layer 019 on the pattern of the common electrode layer 017, as shown in FIG. 5h; and forming through holes in the insulating layer 019 at positions corresponding to the drain electrodes 0131.

9. Forming patterns of pixel electrodes 018 on the pattern of the insulating layer 019, as shown in FIG. 3, in which the pixel electrodes 018 are electrically connected with the drain electrodes 0131 via the through holes formed in the insulating layer 019 and the passivation layer 016.

On the basis of the same invention concept, at least one embodiment of the present invention further provides a display device, which comprises the in-cell touch panel provided by the embodiment of the present invention. The display device may be: any product or component with display function such as a mobile phone, a tablet PC, a TV, a display, a notebook computer, a digital picture frame and a navigator. The embodiments of the display device may refer to the embodiments of the in-cell touch panel. No further description will be given here.

In the in-cell touch panel and the display device, provided by the embodiment of the present invention, the plurality of mutually independent self-capacitance electrodes arranged in the same layer are disposed on the array substrate in accordance with the self-capacitance principle; and the touch detection chip can determine the touch position by detection of capacitance variation of self-capacitance electrode in the touch period. Moreover, the pattern of the shield layer disposed beneath the top-gate TFTs is modified to form the plurality of wirings. On one hand, the formed wirings may connect he self-capacitance electrodes to the touch detection chip to achieve the touch function. On the other hand, the patterns of the formed wirings shield the patterns of the active layers of the top-gate TFTs, so that the phenomenon that normal display is affected by photo-induced carriers produced due to backlight irradiation can be avoided. In the touch panel provided by the embodiment of the present invention, the pattern of the original shield layer disposed beneath the top-gate TFTs is modified to form the wirings corresponding to the self-capacitance electrodes. Therefore, compared with the case that manufacturing processes of two layers must be added on the array substrate, the embodiments of the present invention can achieve the touch function by adding only one process for forming the self-capacitance electrodes, and hence can reduce the manufacturing cost and improve the productivity.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The application claims priority to the Chinese patent application No. 201410239921.3, filed May 30, 2014, the disclosure of which is incorporated herein by reference as part of the application.

The invention claimed is:

1. An in-cell touch panel, comprising:
an array substrate provided with top-gate thin-film transistors (TFTs);
a plurality of mutually independent self-capacitance electrodes arranged in a same layer and disposed on a layer provided with the top-gate TFTs of the array substrate;
a touch detection chip configured to determine a touch position by detection of capacitance variation of the self-capacitance electrodes in a touch period; and
a plurality of wirings disposed beneath the layer provided with the top-gate TFTs of the array substrate and configured to connect the self-capacitance electrodes to the touch detection chip, in which orthographic projections of patterns of the wirings on the array substrate shield patterns of active layers of the top-gate TFTs.

2. The in-cell touch panel according to claim 1, wherein orthographic projections of the wirings on the array substrate are disposed at gaps between pixel units of the array substrate.

3. The in-cell touch panel according to claim 2, further comprising:
first conducting portions arranged in a same layer as source/drain electrodes of the top-gate TFTs, in which the self-capacitance electrodes are electrically connected with the wirings through the first conductive portions; or second conducting portions arranged in a same layer as gate electrodes of the top-gate TFTs, in which the self-capacitance electrodes are electrically connected with the wirings through the second conducting portions.

4. The in-cell touch panel according to claim 3, wherein the source/drain electrodes of the top-gate TFTs are disposed on a layer above or beneath the gate electrodes.

5. The in-cell touch panel according to claim 2, further comprising: first conducting portions arranged in the same layer as source/drain electrodes of the top-gate TFTs and second conducting portions arranged in the same layer as gate electrodes of the top-gate TFTs, wherein the first conducting portions and the second conducting portions are electrically connected with each other; and the self-capacitance electrodes are electrically connected with the wirings through the first conducting portions and the second conducting portions.

6. The in-cell touch panel according to claim 5, wherein the source/drain electrodes of the top-gate TFTs are disposed on a layer above or beneath the gate electrodes.

7. The in-cell touch panel according to claim 2, wherein the self-capacitance electrodes are combined into a common electrode layer on the array substrate.

8. The in-cell touch panel according to claim 7, wherein orthographic projections of gaps between the self-capacitance electrodes on the array substrate are disposed at gaps between pixel units of the array substrate.

9. The in-cell touch panel according to claim 2, wherein the self-capacitance electrodes are arranged in a same layer as a pixel electrode layer on the array substrate; and patterns of the self-capacitance electrode are disposed at gaps between two adjacent pixel electrodes.

10. The in-cell touch panel according to claim 9, wherein the patterns of the self-capacitance electrodes are in a latticed structure taking the pixel electrodes as meshes.

11. The in-cell touch panel according to claim 1, further comprising:
first conducting portions arranged in a same layer as source/drain electrodes of the top-gate TFTs, in which the self-capacitance electrodes are electrically connected with the wirings through the first conductive portions; or
second conducting portions arranged in a same layer as gate electrodes of the top-gate TFTs, in which the self-capacitance electrodes are electrically connected with the wirings through the second conducting portions.

12. The in-cell touch panel according to claim 11, wherein the source/drain electrodes of the top-gate TFTs are disposed on a layer above or beneath the gate electrodes.

13. The in-cell touch panel according to claim 1, further comprising: first conducting portions arranged in the same layer as source/drain electrodes of the top-gate TFTs and second conducting portions arranged in the same layer as gate electrodes of the top-gate TFTs, wherein the first conducting portions and the second conducting portions are electrically connected with each other; and the self-capacitance electrodes are electrically connected with the wirings through the first conducting portions and the second conducting portions.

14. The in-cell touch panel according to claim 13, wherein the source/drain electrodes of the top-gate TFTs are disposed on a layer above or beneath the gate electrodes.

15. The in-cell touch panel according to claim 1, wherein the self-capacitance electrodes are combined into a common electrode layer on the array substrate.

16. The in-cell touch panel according to claim 15, wherein orthographic projections of gaps between the self-capacitance electrodes on the array substrate are disposed at gaps between pixel units of the array substrate.

17. The in-cell touch panel according to claim 1, wherein the self-capacitance electrodes are arranged in a same layer as a pixel electrode layer on the array substrate; and patterns of the self-capacitance electrode are disposed at gaps between two adjacent pixel electrodes.

18. The in-cell touch panel according to claim 17, wherein the patterns of the self-capacitance electrodes are in a latticed structure taking the pixel electrodes as meshes.

19. A display device, comprising the in-cell touch panel according to claim 1.

20. An in-cell touch panel comprising:
a substrate;
a plurality of wirings on top of the substrate, wherein a portion of the plurality of wirings comprises a shield layer;
an insulating layer on top of the plurality of wirings;
an active layer of a thin film transistor (TFT) disposed on top of the insulating layer, wherein the shield layer of the plurality of wirings is configured to be directly beneath the active layer such that photo-induced carriers produced from backlight irradiation is avoided at the active layer by the shield layer;
a gate insulating layer on top of the active layer;
a gate of the TFT disposed on top of the gate insulating layer in which the gate is configured to be narrower than the active layer; and
an interlayer insulating layer on top of the gate;
an electrode on top of the interlayer insulating layer and which is electrically connected to the shield layer in which the electrode and shield layer form part of a touch sensitive capacitor; and
a touch detection chip coupled to the plurality of wirings such that the touch detection chip is configured to determine a touch position by detection of variation in capacitance of the touch sensitive capacitor during a touch period.

* * * * *